United States Patent [19]

Mita

[11] Patent Number: 5,149,977
[45] Date of Patent: Sep. 22, 1992

[54] DOCUMENT READER APPARATUS

[75] Inventor: Kikuo Mita, Yokohama, Japan

[73] Assignee: Eastman Kodak Company, Rochester, N.Y.

[21] Appl. No.: 659,219

[22] Filed: Feb. 21, 1991

[30] Foreign Application Priority Data

Jun. 1, 1990 [JP] Japan .................. 2-143924

[51] Int. Cl.$^5$ ............................................. G60K 9/00
[52] U.S. Cl. .................................... 250/556; 250/561
[58] Field of Search .................. 250/556, 561; 382/46

[56] References Cited

U.S. PATENT DOCUMENTS

| | | | |
|---|---|---|---|
| 4,533,959 | 8/1985 | Lakurai | 382/46 |
| 4,802,229 | 1/1989 | Yamada | 382/46 |
| 5,001,766 | 3/1991 | Baird | 382/46 |
| 5,021,676 | 6/1991 | Drason et al. | 250/561 |
| 5,027,227 | 6/1991 | Kita | 382/46 |
| 5,048,094 | 9/1991 | Aoyama et al. | 382/46 |
| 5,054,098 | 10/1991 | Lee | 382/46 |

Primary Examiner—Janice A. Howell
Assistant Examiner—Richard Hanig
Attorney, Agent, or Firm—Raymond L. Owens

[57] ABSTRACT

A document reader (scanner) is disclosed which can automatically provide a provisional decision on the acceptability of the document image quality, and display the documents judged to be unacceptable for visual confirmation, using a display means. The apparatus can detect skewing of documents and anomalous document image contrasts, and the degree of skewing to be detected can be adjusted as required.

11 Claims, 12 Drawing Sheets

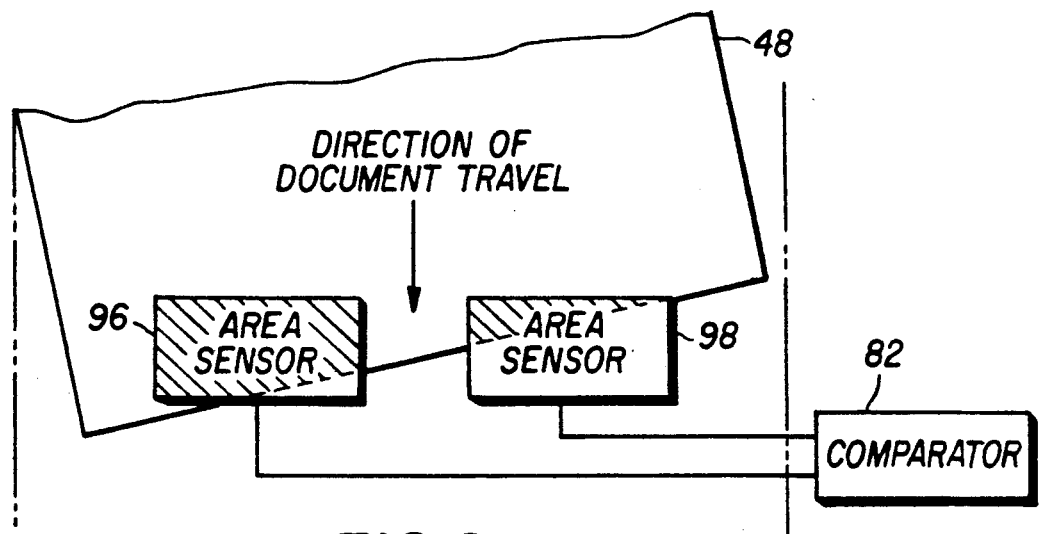
FIG. 6
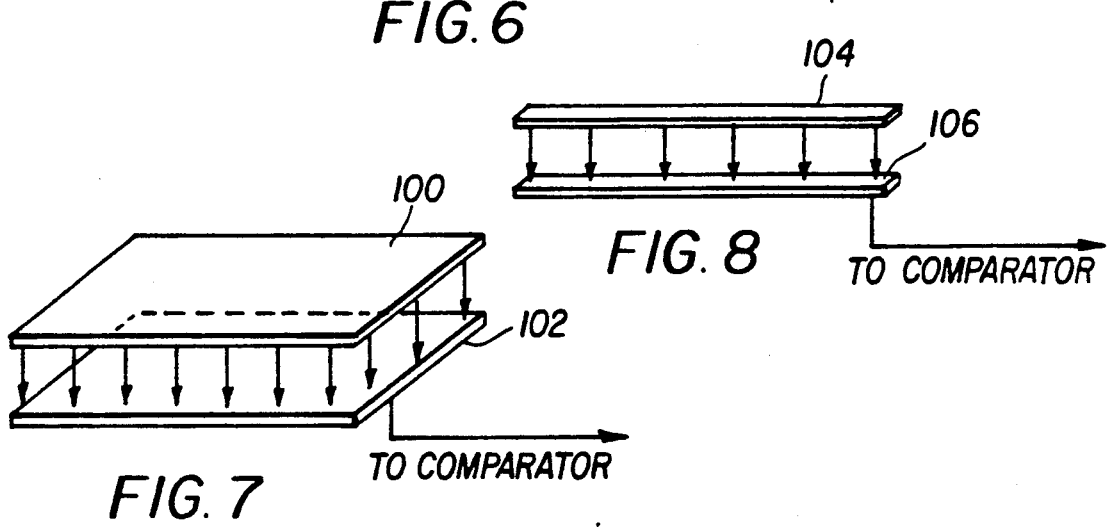
FIG. 7
FIG. 8
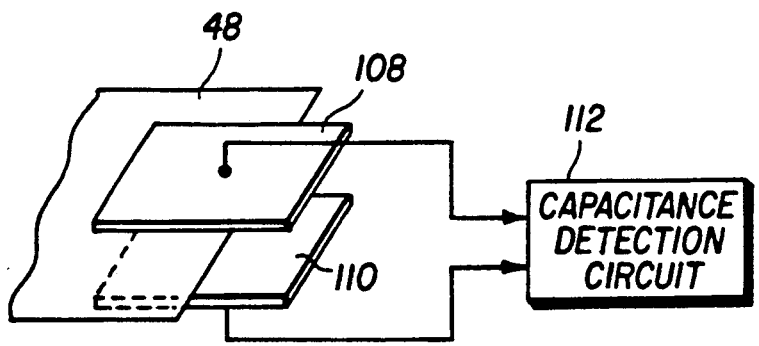
FIG. 9

DOCUMENT READER APPARATUS

BACKGROUND OF THE INVENTION

FIELD OF THE INVENTION

The present invention relates to document reading apparatus which judges the image quality of the document and determines whether the quality of the scanned image data is acceptable.

DESCRIPTION OF THE PRIOR ART

Often document reading apparatus optically reads in a document, digitizes the document image and stores the digitized image signals or transmits them to a host computer. The ability to process the document image data in the form of electrical signals facilitates the speedy storage, retrieval, duplication and transmission of large quantities of such image data. Document readers of this type are being developed to meet modern society's need for high-speed processing of growing quantities of information.

Conventional document reader apparatuses usually consist of a document feed section, a document optical reading section and a document eject section. In a typical such arrangement, a quantity of documents are stacked in the feeder section. These documents are then fed one at a time to the reader section. At the reader section the documents are scanned by a beam of light and the light reflecting from the document is detected by an optical sensor such as, for example, a charge-coupled device (CCD), which digitizes the stream of image data. After being scanned the document is then ejected from the apparatus.

If in the course of its transport through the apparatus a document becomes skewed and is read while askew, the result may be a degradation in the legibility of the read image and part of the document falling outside the readable limits of the apparatus. Also, accurate reading of the image data may be hindered by inappropriate contrast of the document itself, or owing to the use of an inappropriate threshold setting for binarizing the image. In such cases, the result may be unacceptably poor image quality or read errors that necessitate reprocessing the document or discarding of the poor quality image data.

In conventional arrangements, image quality is checked by, for example, visual examination and confirmation of all the read image data, which is displayed on a monitor for that purpose. A more advanced way of dealing with image degradation caused by skewing involves the use of a skew detection system, which consists of providing optical sensors at two locations along the document path, whereby a difference between the times the document reaches each sensor indicates the document has become skewed, whereupon the apparatus is stopped and the document is rescanned.

While the conventional method of using visual inspection of all documents being scanned is a reliable way of checking whether read errors have occurred because of document skewing or inappropriate contrast, in practice this is not feasible, as it flies in the fact of the need for high-speed processing of large numbers of documents. Similarly, while skewing can be detected by means of sensors, having to stop the apparatus each time skewing occurs is inefficient. Moreover, sometimes even when a document becomes skewed, the skewing may not be to the extent that it causes a necessary part of the document to be missed, but with the conventional systems all cases of skewing are treated the same, which is wasteful.

SUMMARY OF THE INVENTION

The object of the present invention is therefore to overcome the drawbacks of the systems described above by providing a document reader apparatus which offers good operating efficiency by making it possible to readily, reliably and efficiently detect whether the quality of the read-in image is acceptable.

In the present invention this object is attained by a document reader apparatus comprising image data reading means for optically reading and converting the image to image data electrical signals, first image data storage means for storing the image data, image quality judgement means which converts the quality of the stored images to a numerical value and compares these numerical values with a reference value to determine whether or not the image quality is acceptable, and image display means for providing on a monitor display screen a continuous readout of image data from the first image data storage means which the image quality judgement means has determined as being of unacceptable quality, whereby the image quality judgement means provides a primary judgement of the acceptability of the document image data acquired by the image data reading means, and only image data the image quality judgement means has judged to be of unacceptable quality is displayed on the monitor screen for a secondary, visual judgement.

The document reader apparatus according to the present invention further comprises image data reading means for optically reading and converting the image to image data electrical signals, first image data storage means for storing the image data, image quality judgement means which converts the quality of the stored images to a numerical value and compares these numerical values with a reference value to determine whether or not the image quality is acceptable, second image data storage means for storing image data which the image quality judgement means has judged to be of unacceptable quality, and image display means for providing on a monitor display screen a continuous readout of image data from the second image data storage means, following the completion of the reading, operation, whereby the image quality judgement means provides a primary judgement of the acceptability of the document image data acquired by the image data reading means, and image data which the image quality judgement means has judged to be of unacceptable quality is stored in the second image data storage means and, following the completion of the reading operation, is read out from the second image data storage means and displayed on the image display means monitor screen for a secondary, visual judgement.

In the document reader apparatus thus configured, the document image obtained by the image data reading means is converted to electrical signal image data which is stored in the first image data storage means. The quality of the images stored in the first image data storage means is then converted to a numerical value by the image quality judgement means which then compares the numerical value with a predetermined reference value, providing a primary decision on the acceptability of the image quality. Then, image data which the image quality judgement means has determined as being of poor quality is read out onto an image display monitor display screen for a secondary, visual, judgement.

Also in accordance with the document reader apparatus of the invention, image data which has been determined as being of poor quality in the primary judgement of the image quality judgement means is stored in a second image data storage means. Following the completion of the reading operation, image data from the second image data storage means is read out and displayed on a monitor screen for a secondary, visual, judgement.

Thus, by using a two-stage image quality judgement the document reader apparatus according to the present invention makes it possible to ascertain reliably and efficiently whether the quality of large quantities of scanned image data is acceptable.

Further features of the invention, its nature and various advantages will become more apparent from the accompanying drawings and the following detailed description of the invention.

BRIEF DESCRIPTION OF THE DRAWINGS

FIG. 6 is a diagram of the skew detection sensors of an image quality judgement means according to a fourth embodiment;

FIG. 7 is a perspective drawing of an area type photosensor;

FIG. 8 is a perspective drawing of a line type photosensor;

FIG. 9 is a perspective drawing of a capacitance type sensor;

DETAILED DESCRIPTION OF THE PREFERRED EMBODIMENT

Figure 16:
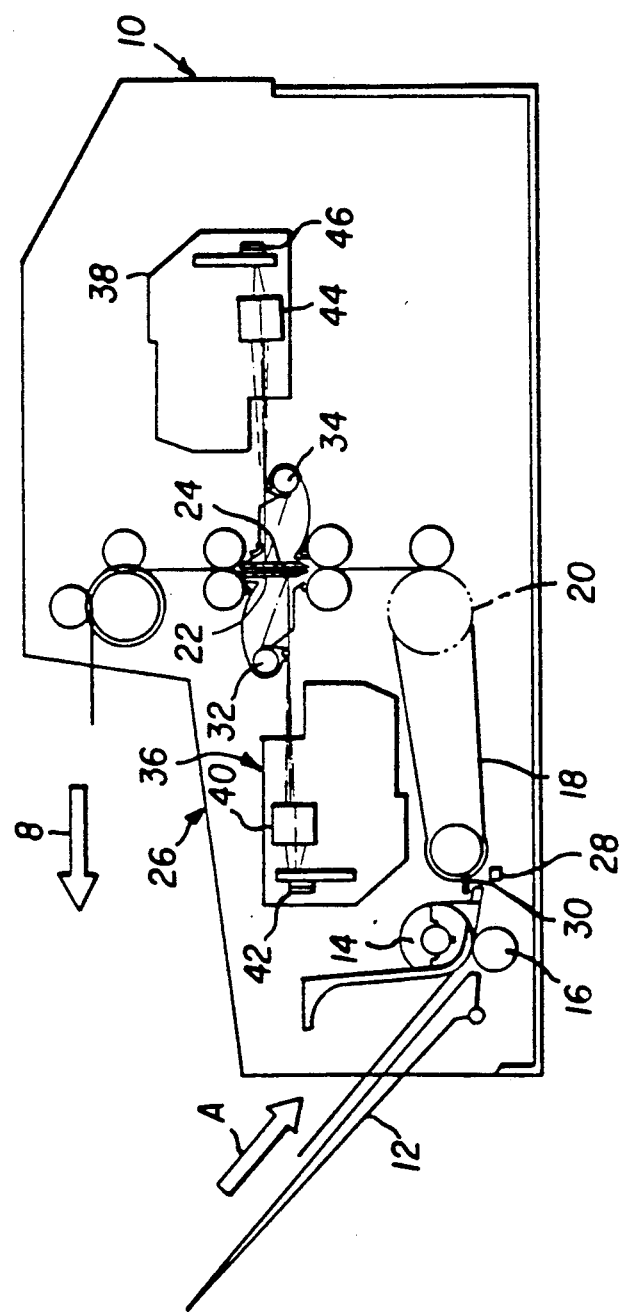
FIG. 16 is a general explanatory diagram of the apparatus according to the first embodiment of the present invention.

The invention will now be described with reference to FIGS. 1 and 16, where are diagrams showing the overall arrangement of a first embodiment of the document reader apparatus according to the present invention.

The document path of the illustrated apparatus has a horizontal intake and a vertical eject and is divided into a document supply section, reading section and eject section. The document is moved along the path by a motor, the motive power of which is transmitted by a gear train and pulleys. This apparatus is capable of reading both sides of a document simultaneously, for which it is equipped with first and second light sources, and corresponding first and second reading sections.

The document path configuration will now be described with reference to FIG. 16. Documents to be scanned are stacked in a document feed tray 12, which extends from a case 10. Provided near the document feed tray 12 are a feed roller 14 and a retard roller 16, arranged vertically opposite to each other. The topmost document is drawn into the apparatus in the direction indicated by arrow A by the counterclockwise rotation of the feed roller 14, while at the same time the counterclockwise rotation of the retard roller 16 serves to urge the documents below the topmost one back towards the document feed tray 12.

The feed path continues with a horizontal feed belt 18, which conveys the document to turn roller 20. The turn roller 20 marks the end of the feed path and the beginning of the vertical path. In the vertical path the document enters the read path, which includes a first aperture plate 22 and a second aperture plate 24. The document is scanned as it passes between these aperture plates 22 and 24. After the read path the document enters the ejection path, from which it is ejected in the direction indicated by arrow B, into a stocker 26.

The document path thus arranged is provided with sensors to check that documents are drawn into, and ejected from, the apparatus correctly. In this embodiment, on the document input side a document sensor 28 is provided just before the feed belt 18. This document sensor 28 is an optical one constituted of a light emitter and a light receiver.

A reflector 30 is provided above the document path. A vertical beam of light from the document sensor 28 is projected up through the document path to impinge on the reflector 30. Therefore, when there is no document to interrupt the beam the reflector 30 reflects the light back to the document sensor 28, while the intake of a document is indicated by the fact that the document interrupts the sensor beam.

In addition, if the speed at which the document is transported is known, the detection of the leading edge of the document by the document sensor 28 can be used to indicate the timing of the document's arrival at the reading position, described below.

The arrangement of the reading section will now be described. First and second reading positions are formed in the central part of the respective aperture plates 22 and 24. Light sources 32 and 34 are provided to each project a prescribed beam of light at the reading positions; in the drawing these beams of light are each indicated by a dashed line. The reflection of each beam of light from the document corresponds to the brightness of the light. The reflected light is guided to the reading sections, described below, as indicated by dashed lines.

Reading sections 36 and 38 are provided to read in the light reflected by the document. Specifically, the first reading section 36 includes a lens system 40 through which light reflected from the first reading position passes and impinges on a light receiving section 42 to thereby scan one line at a time.

The structure of the second reading section 38 is substantially the same as that of the first reading section 36, having a lens system 44 and a light receiving section 46, with light reflecting from the second reading position passing through the lens system 44 and impinging on the light receiving section 46.

The document reading operation will now be described. The topmost of the documents stacked in the document feed tray 12 is drawn into the document path by the feed roller 14 while the other documents are held back by the retard roller 16, so that documents enter the path one at a time.

When a document is detected by the intake side document sensor 28, the document sensor 28 sends a signal to a controller (not shown). The controller puts out a scan start command to each of the reading sections 36 and 38, with a preset time delay based on the distance between the document sensor 28 to the reading position and the speed at which the document is moving along the path. When the document reaches the reading position, the required document reflected image data from one or both sides of the document is read by the reading sections 36 and 38 and stored. The controller can of course be made to cause a desired part of the document to be read instead of the whole document by trimming the reading position. After the document has been scanned it is ejected from the ejection path into the stocker 26. Thus the documents are scanned automatically in a continuous flow.

Details of the circuit configuration and operation for judging the quality of the scanned image data will now be explained, with reference to FIG. 1, which is a schematic diagram of the apparatus of the embodiment. Documents 48 stacked in the document feed tray 12 are fed separately into the apparatus by the action of the feed roller 14 and retard roller 16, as described above. Provided downstream of the feed roller 14 are LEDs (light-emitting diodes) 50 and 52 arranged above the document path, and directly below these LEDs are photosensors 54 and 56. This arrangement enables detection of the time it takes for a document 48 to come between the LEDs 50 and 52 and the photosensors 54 and 56, whereupon the photosensors 54 and 56 each output a signal to a time measurement circuit 60 in an image quality judgement means 58, which measures the time differential between the signals from the photosensors.

Figure 1:
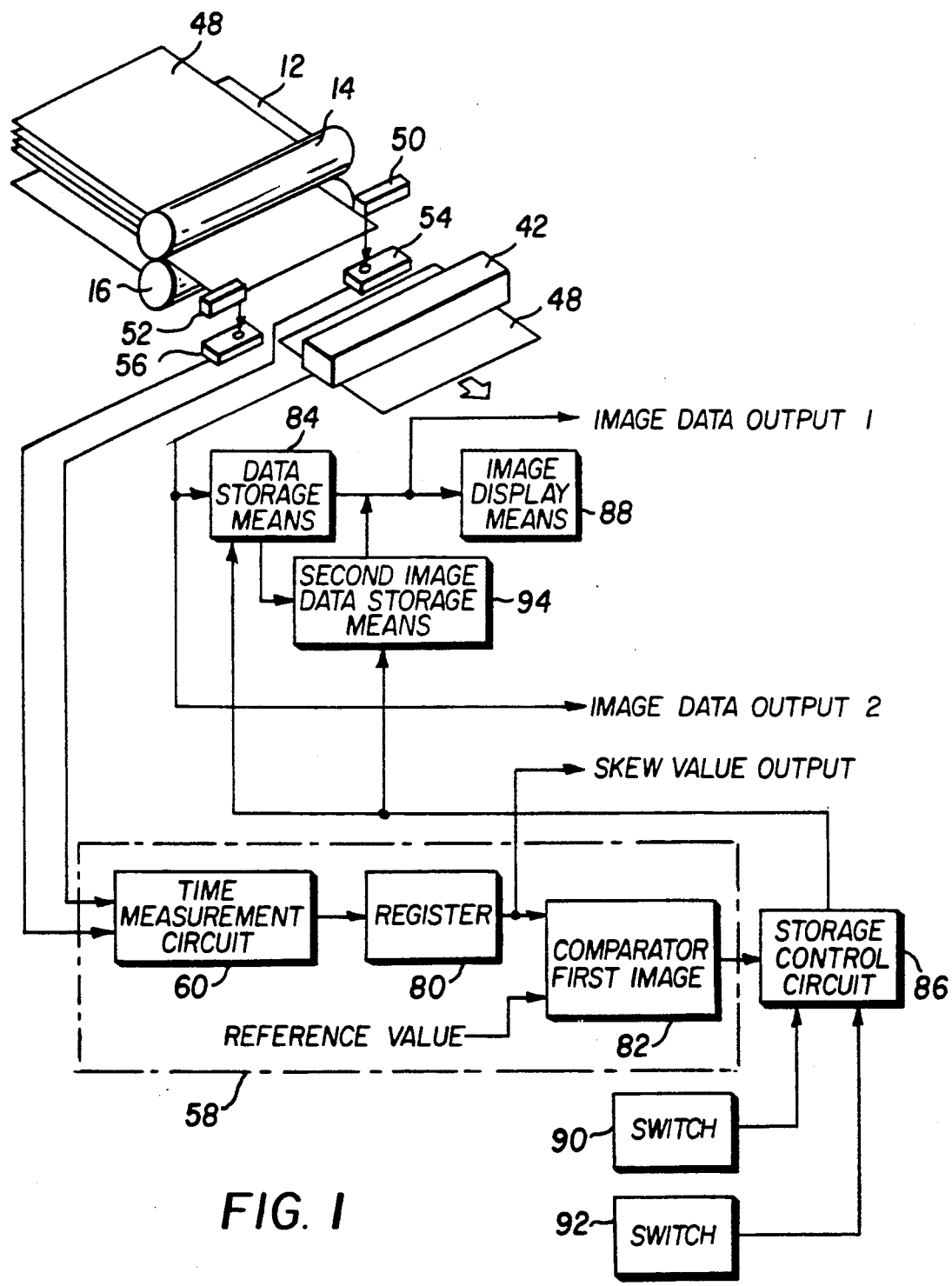
FIG. 1 is a block diagram of a first embodiment of the present invention.
Figure 2:
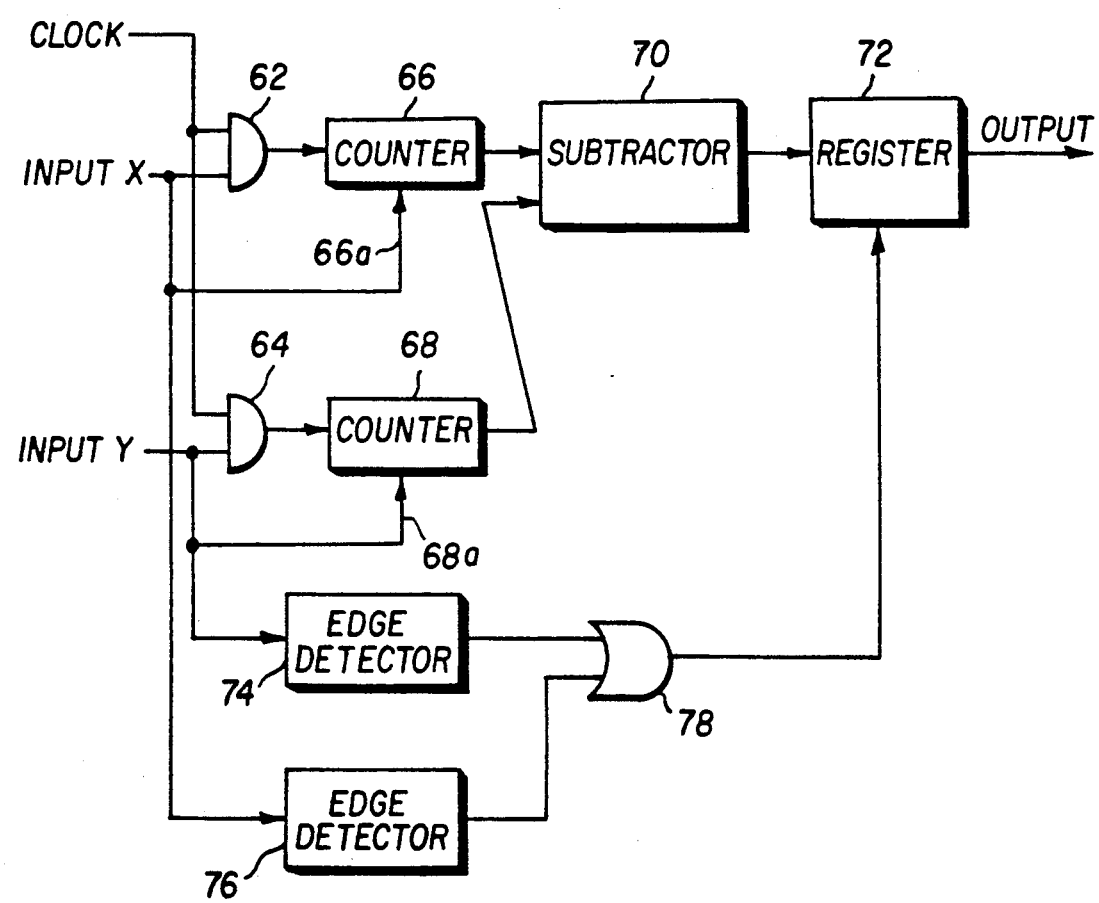
FIG. 2 shows an example of a time measurement circuit for the apparatus of FIG. 1.

FIG. 2 shows an example of this time measurement circuit. In FIG. 2, x and y are signals from the photosensors 54 and 56 shown in FIG. 1 which are each input to an input terminal of AND gates 62 and 64. A clock signal is input to the other terminal of the AND gates 62 and 64 and counters 66 and 68 produce counts of the period the signals x and y are High, which is the period during which there is no document over the sensors. The outputs of the counters 66 and 68 are input to a subtracter 70 to obtain the difference between the counts of the counters 66 and 68, meaning the time difference. The output of the subtracter 70 is then input to a register 72.

The signals x and y are also input to the reset terminals 66a and 68a of the counters 66 and 68 so that the counters are initialized when the respective x or y signal goes Low, which is when a document is over the sensors. The signals x and y are also input to edge detection circuits 74 and 76, the outputs of which are input to the register 72 via an OR gate 78, at which point the register data is fixed.

Thus, the counters 66 and 68 are both initialized when the document passes over the sensors, and a skewed document will give rise to a difference in the time counts of the input signals from the sensors. As a result, the subtracter 70 calculates the time difference between the point at which one of the input signals goes High and the point at which the other input signal goes High, and outputs the result to the register 72. A trailing-edge detection signal output by the OR gate 78 fixes this data in the register 72. This means that the time differential obtained by the time measurement circuit 60 represents the degree of skew, and is stored in a register 80 (FIG. 1). In this way the image quality of the skewed document is given a numerical value.

The time it will take for a document 48 to reach the reading path and the image to be acquired by the light receiving section 42 is estimated, and the output from the register 80 is compared with a reference value by a comparator 82. This reference value may be, for example, any value which represents the allowable amount of skew above which it will be difficult to read the document or part of the document will be out of the scannable area. When the register 80 output value exceeds the reference value, it is determined that the document is skewed to a degree where it will have an adverse effect on the image quality, while if the value does not exceed the reference value, it is judged that the image quality is within the permissible limits. Thus assigning a numerical value to the image quality acceptability enables the primary judgement to be exercised automatically.

Figure 3:
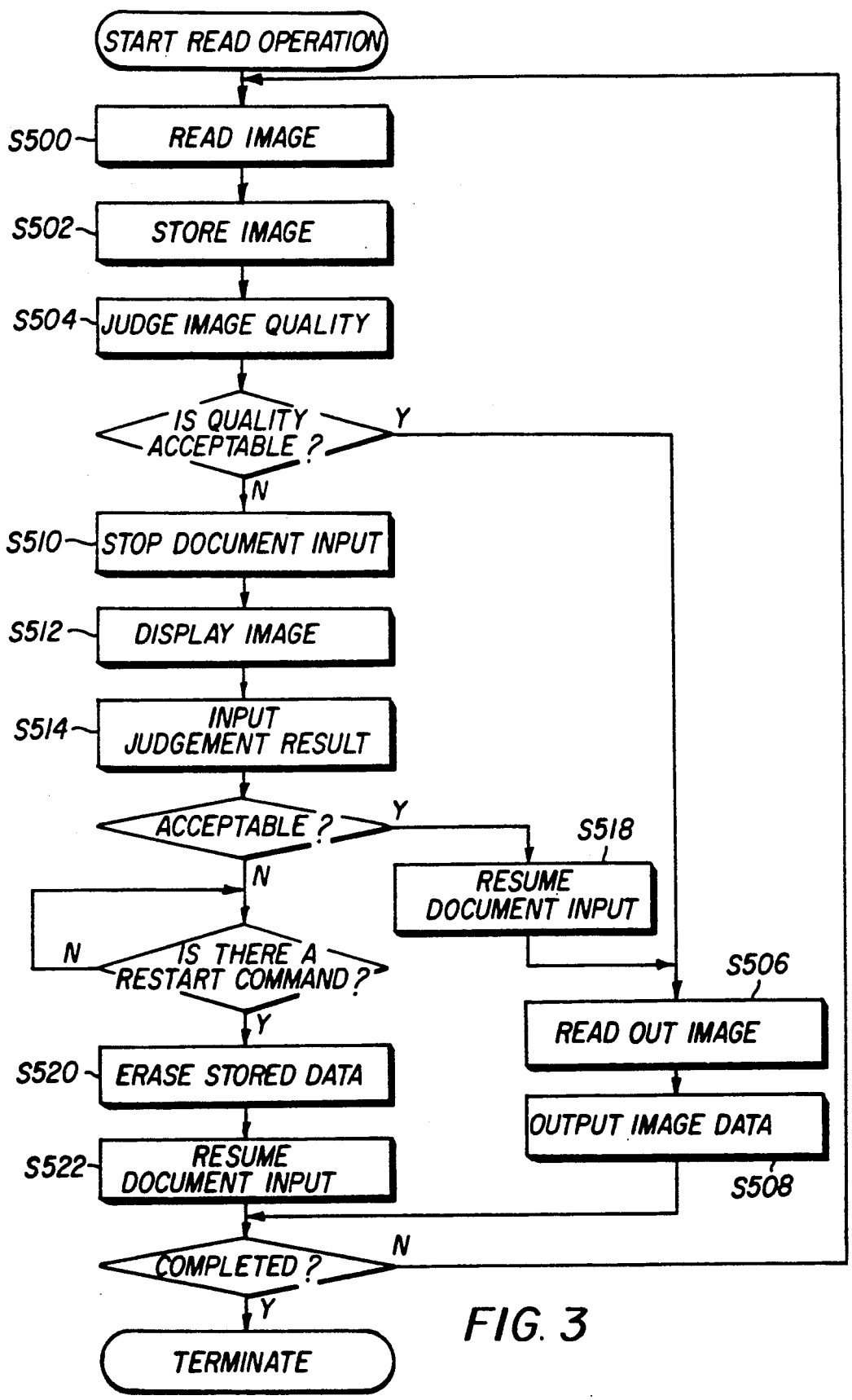
FIG. 3 is a flow chart relating to the operation of the first embodiment.

FIG. 3 is a flow chart of the operational sequence of the embodiment, and will now be explained with reference to FIG. 1. In step 500 the document scanned image is acquired by the light receiving section 42, and in step 502 the image data is stored in a first image data storage means 84. In step 504 the image quality is judged in parallel with the image reader.

If the comparator 82 judges the image quality to be good, in step 506 the storage control circuit 86 causes the contents of the first image data storage means 84 to be read out, and as the image data is output, in step 508 the corresponding image data in the first image data storage means 84 is erased.

In step 510, document input is halted if the comparator 82 judges the image quality is poor, and in step 512 the image data in data storage means 84 is not output outside the apparatus but is instead displayed on the monitor screen of an image display means 88. Then, in step 514, the operator performs a secondary judgement of the image quality by visually checking the screen image.

As a result, in step 518 document input is resumed if the image quality is judged to be within the permissible limits, a first switch 90 is pressed to signal this to the storage control circuit 86, and the procedure moves to step 506.

If the image quality is judged to be outside the allowable limits a second switch 92 is pressed to signal this to the storage control circuit 86, the procedure moves to step 520 and the image data concerned is erased from the first image data storage means 84 without being output. Then, in step 522, document input is resumed. The reading operation is concluded if there are no more documents left. If there are still documents remaining, the procedure is resumed, starting from step 500.

In accordance with the first embodiment of the document reader apparatus thus described, document skew is numerically compared to a reference value to provide a primary determination of image quality, and only images judged to be of poor quality are displayed for a secondary visual judgement of the quality. This enables read errors to be detected efficiently, while the final visual evaluation/judgement ensures an accuracy, reliable judgement of image quality and, therefore, enhances the efficiency of the reading operation.

Figure 4:
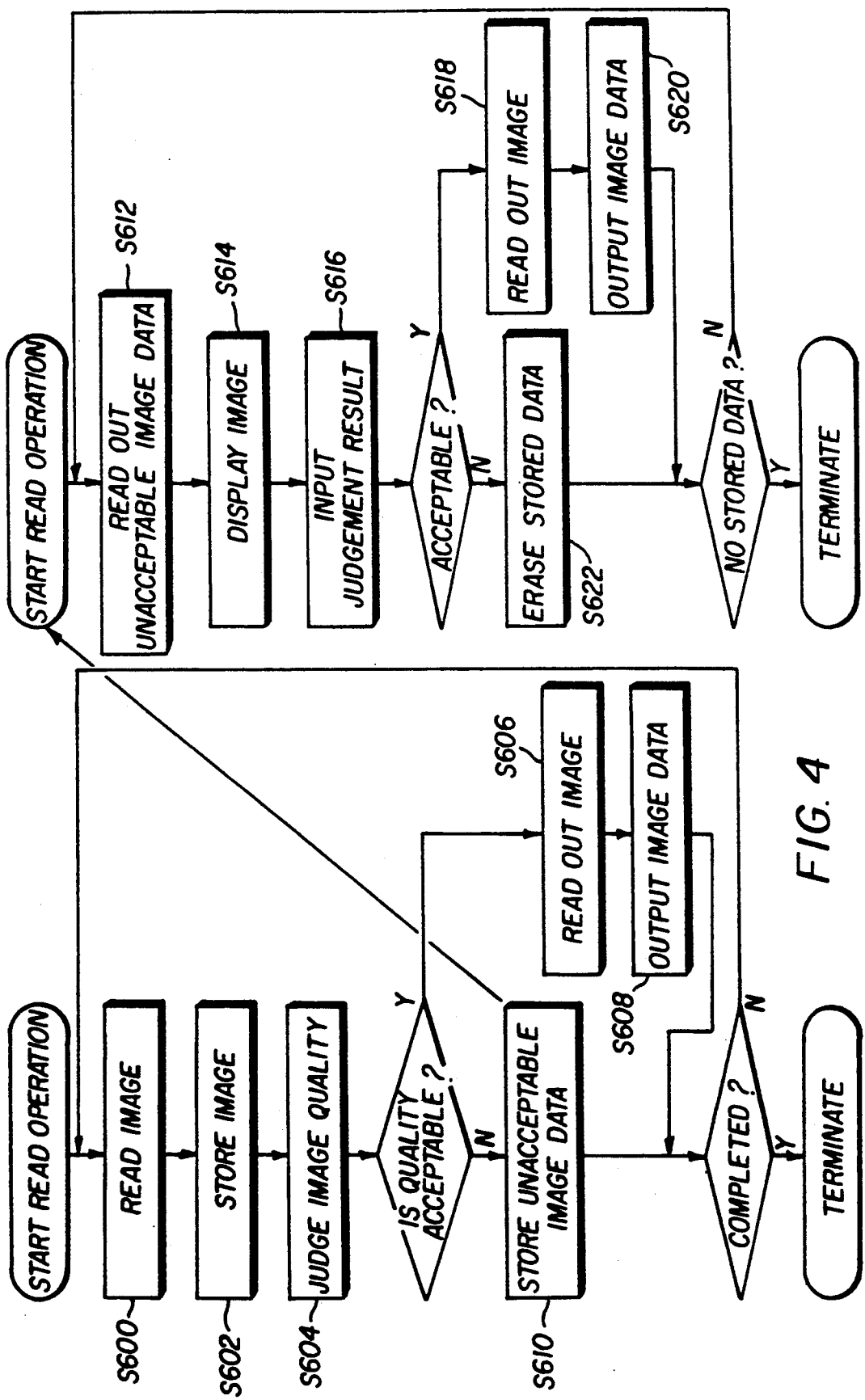
FIG. 4 is a flow chart relating to the operation of a second embodiment.

FIG. 4 is a flow chart of the operation of a second embodiment of the invention. Here, the image judgement process of steps 600 to 604 is the same as that of the corresponding process in the first embodiment, i.e., the process of steps 500 to 504 of FIG. 3. The distinguishing feature of the second embodiment is the provision of a second image data storage means 94, shown in FIG. 1.

Of the image data provisionally stored in the first image data storage means 84, image data which has been judged by the image quality judgement means 58 as being of poor quality is stored in this second image data storage means 94, in step 610. Image data determined as being of good quality is processed in the normal way in steps 606 and 608, which correspond to steps 506 and 508 in the fist embodiment. Upon completion of the document reading operation, in step 612 the poor quality image data stored in the second image data storage means 94 is read out and in step 614 is displayed by the image display means 88. In step 616 the result of a visual evaluation of the image data thus displayed is input. Based on the result of this evaluation, the image data is subjected to the procedures of steps 618, 620 and 622, corresponding to steps 506, 508 and 520 of the first embodiment.

Therefore, in the document reader apparatus of this embodiment, all image data which is initially judged as being of poor quality is stored in the second image data storage means 94 and after the completion of the read operation is read out for a secondary visual evaluation. Thus, in addition to the effect of the first embodiment, read efficiency is enhanced as the reading can be carried out on a continuous basis without having to stop the apparatus.

Figure 5:
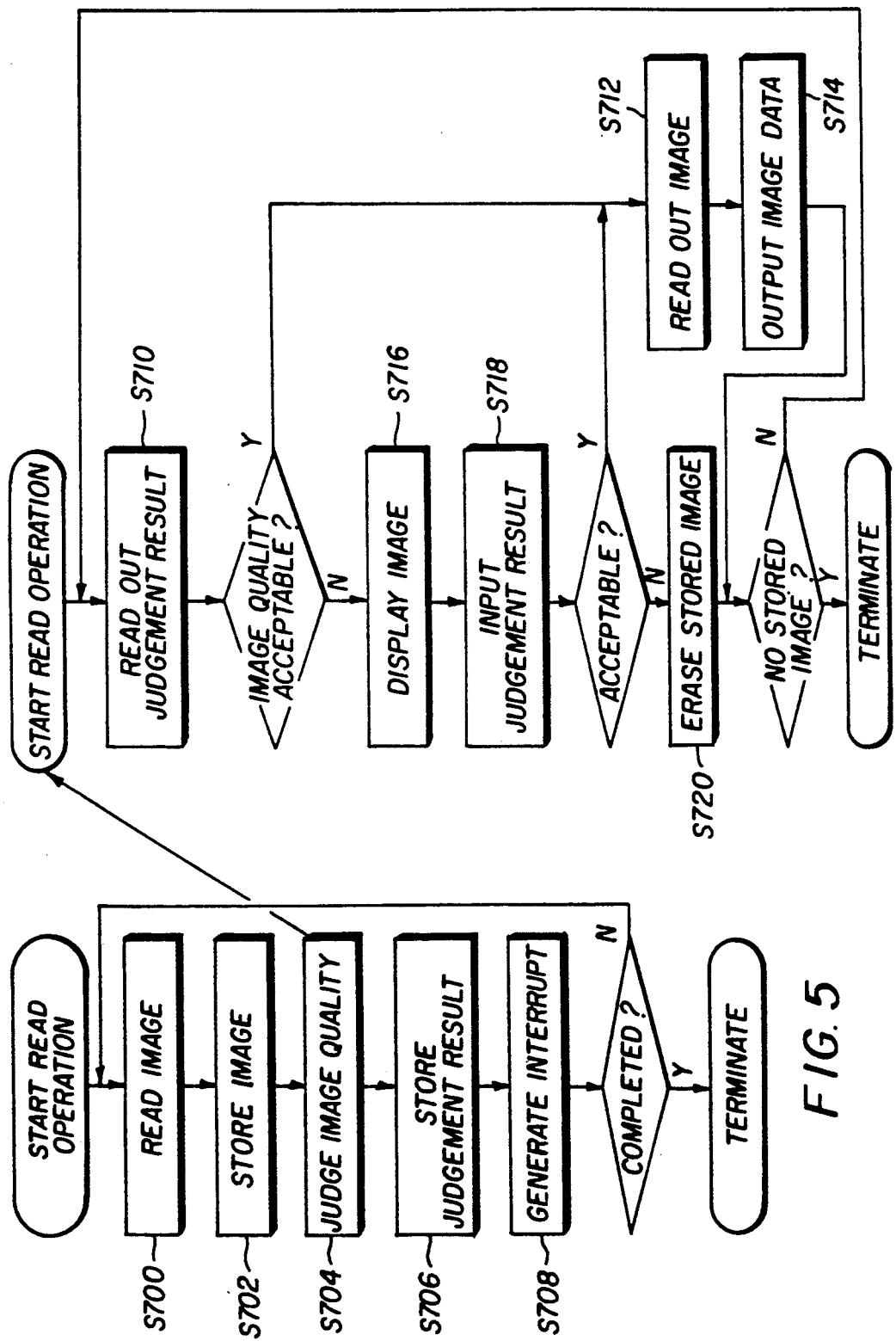
FIG. 5 is a flow chart relating to the operation of a third embodiment.

FIG. 5 is a flow chart of the operation of a third embodiment. While the third embodiment is basically the same as the second embodiment, in contrast to the second embodiment in which only image data judged to be of poor quality is stored in the second image data storage means 94, in the third embodiment the image quality evaluation result is stored (in step 706) and following the completion of the reading, in step 708 an interrupt is generated, and in step 710 the evaluation result is read out while judging the acceptability of the image quality.

When the result of the evaluation is that the image quality is judged to be good, the image data concerned is read out from the first image data storage means 84 and output, in steps 712 and 714. When the image data is judged to be of poor quality, it is displayed on the monitor screen in step 716, the result of the visual evaluation is input in step 718, and if the image quality is poor, in step 720 the data is erased. If the quality of the image data is within the acceptable limits, it is read out and output, in steps 712 and 714.

Thus, in accordance with this third embodiment, the evaluation result can be stored and the image data processed together after completion of the reading operation. As a two-stage evaluation of image quality is used, this embodiment also has the same merits as the other embodiments that have been described.

Instead of writing the image data into the first image data storage means 84, as shown in FIG. 1, it can be directly output from the apparatus (image data output 2) together with the skew value data stored in register 80, for suitably processing outside the apparatus.

FIG. 6 is a diagram of a skew detection sensor arrangement for judging image quality according to a fourth embodiment; FIG. 7 is a perspective view of an area type photosensor, FIG. 8 is a perspective view of a line type photosensor, and FIG. 9 is a perspective view of a capacitance type sensor.

The first embodiment uses a detection means whereby the extent of document skew is ascertained by the different times at which the edge of the document reached the sensors. This fourth embodiment, however, as shown in FIG. 6, uses a skew detection sensor arrangement constituted of a pair of area sensors 96 and 98 and the comparator 82.

As shown in FIG. 7, the area sensors 96 and 98 may be constituted as area light-emitting devices 100 such as LEDs provided in a prescribed region opposite area photosensors 102 the output of which corresponds to the light receiving area or, as shown in FIG. 8, line type light-emitting devices 104 such as LEDs arranged in a row opposite to line type photosensors 106, thereby facilitating the accuracy detection of skewing.

The principle of this arrangement is that, with reference to FIG. 6, the output of the area sensors corresponds to the amount of the document that covers the sensor region (the hatched portion in the drawing), so that a skewed document will give rise to differences in the outputs of the area sensors provided on the two sides of the document path, corresponding to the degree of the skewing. This output value difference is utilized to obtain the extent of such skewing. The difference can also be used to poor quality image data defined as image data obtained by the reading of a document which is excessively skewed, as indicated by an output value differential which exceeds a prescribed value.

Although in the above example the area sensor is an optical type, other types are applicable such as the capacitance sensor shown in FIG. 9. This capacitance sensor is constituted by a pair of metal plates 108 and 110 arranged in parallel, one above and one below the document path, to form a capacitance detection section, and a capacitance detection circuit 112. The insertion of a document 48 between the plates 108 and 110 when a charge has been applied to the plates to create a potential differential therebetween will produce a change in capacitance that corresponds to the area of the document between the plates. As such, providing these capacitance sensors at the positions of the area sensors 96 and 98 at the left and right of the document path (FIG. 6) enables skewing to be detected in the same way as when the photosensors are used.

Thus, using such an area sensor arrangement enables document skew that exceeds a prescribed angle to be detected readily and accurately, making it suitable for use as an image quality judgement means.

A fifth embodiment will now be described, with reference to FIG. 10, which is a drawing of a skew detection sensor for judging image quality, and FIG. 11, which shows an array of document detection sensors. Here the skew detection sensor is constituted by document sensors for detecting the presence or absence of a document, and a skew detection section which monitors the output state of the document sensors.

Figure 10:
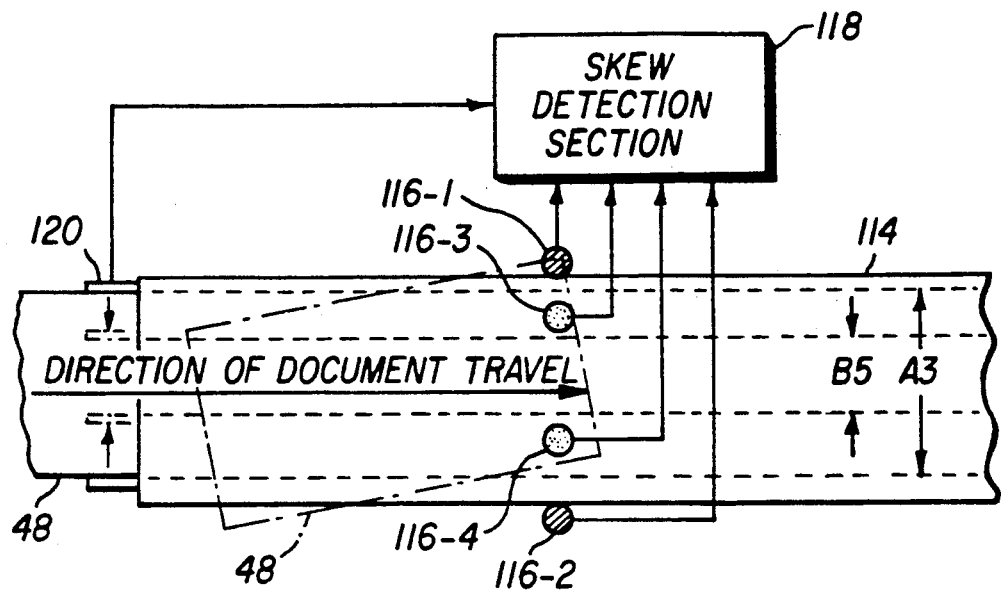
FIG. 10 is a diagram of the skew detection sensors of an image quality judgement means according to a fifth embodiment.

As shown in FIG. 10, document detection sensors 116-1, 116-2, 116-3 and 116-4 are provided at positions which correspond to the width of the document 48 being transported along a transport path 114. The positioning of the document sensors ensures that only documents which are skewed by an angle that exceeds a prescribed value are detected. Therefore, when a document of a prescribed width is being transported along the path, detection of the document surface by the sensors will indicate that the document is skewed.

With reference to the example of FIG. 10, if the document, indicated by a single-dot line, is the width of a standard A3-sized document and is not skewed, it will not project outside the area of the path 114 marked by dashed lines indicating the width of an A3 document, and as such will not be detected by the sensors 116-1 and 116-2. However, a portion of any document 48 that is skewed beyond a prescribed degree will pass over the sensors 116-1 and 116-2, thereby enabling such skewing to be detected easily and reliably.

The degree of skewing which is to be detected can be adjusted by changing the positions of the document sensors. The sensors can be moved closer in towards the document path to reduce, or moved outward to increase, the permitted degree of skewing. Document detection sensors 116-3 and 116-4 can be used for detecting skewing of B5-sized documents.

Document detection operations are processed by a skew detection section 118 (FIG. 10). For this the outputs from the various sensors are input to the skew detection section 118. However, skew detection could be automated by providing the skew detection section 118 with document width information output by entry side document alignment guides 120 and, based on this width information, monitoring only the outputs of the appropriate sensors.

Document width information may also be directly input to the skew detection section 118 by the operator, via the operation panel or a host computer linked to the apparatus.

Figure 11:
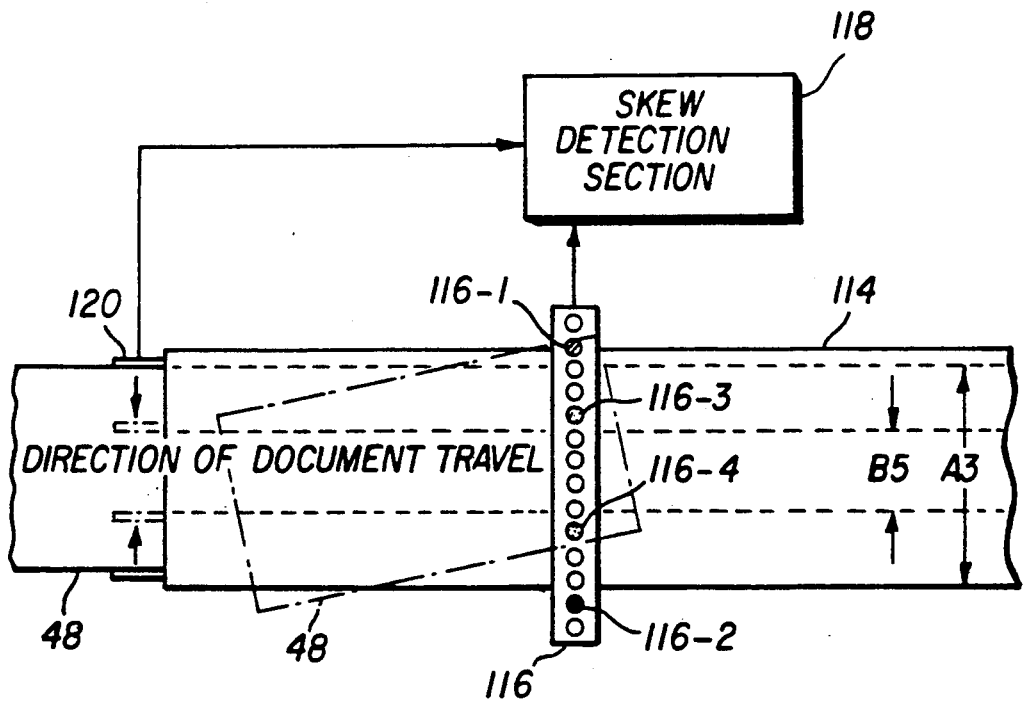
FIG. 11 is a diagram of an array-type skew sensor arrangement used in the apparatus of FIG. 10.

As shown in FIG. 11, a document detection sensor array 116 is arranged across the document transport path 114. With such an arrangement, the document detection sensors 116-1 and 116-2, or 116-3 and 116-4, could be selected in accordance with the document width concerned. The ability to readily select sensors at positions corresponding to different document widths gives this configuration considerable flexibility as it enables the skew angle that is to be detected to be changed.

Using this skew detection sensor arrangement thus described enables the acceptability of the image data to be promptly detected from the degree of skewing.

Figure 12:
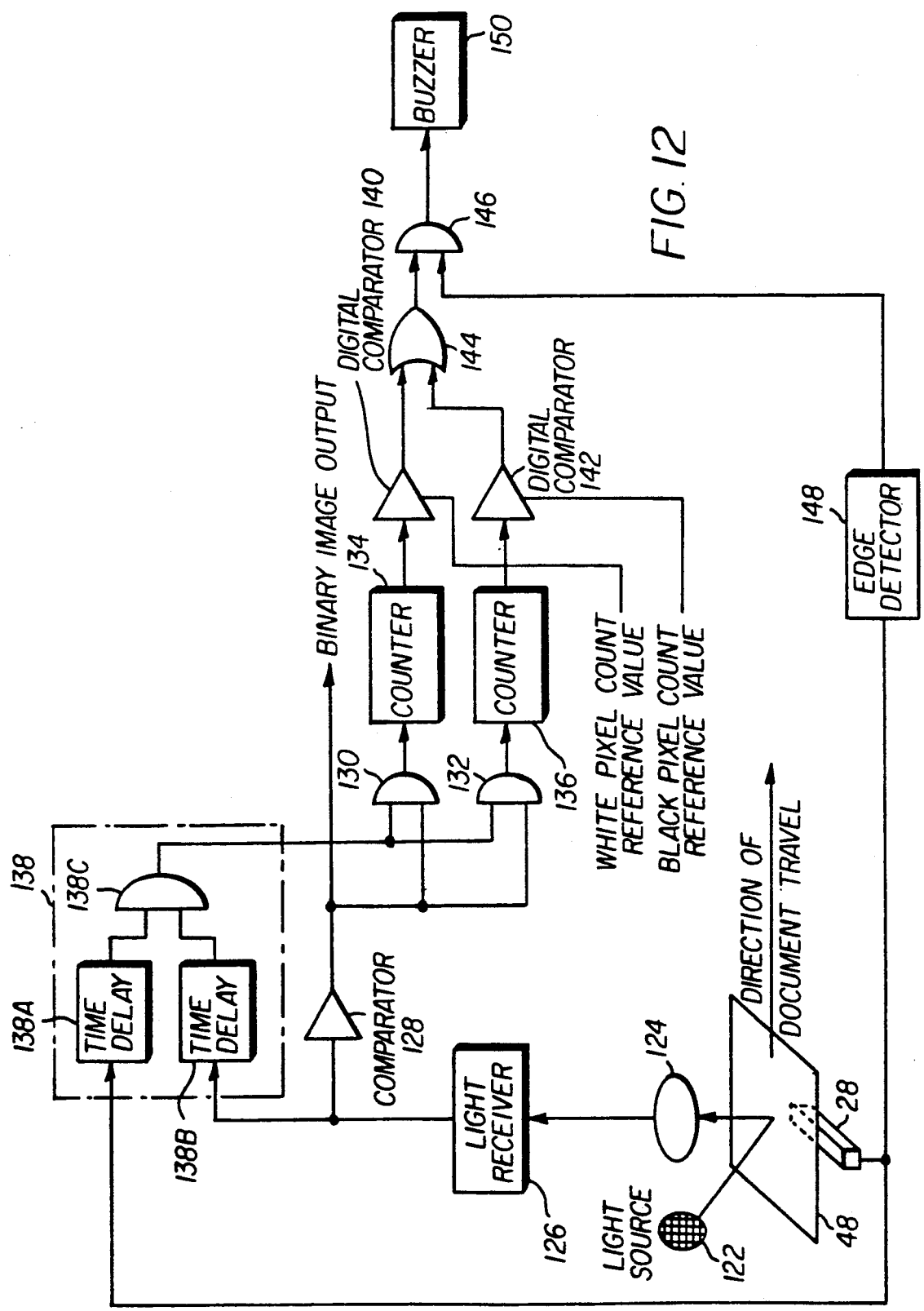
FIG. 12 is a circuit diagram of an image quality judgement means according to a sixth embodiment.

FIG. 12 is a circuit diagram of an image quality judgement means according to a sixth embodiment. In the embodiments described so far the image quality judgement means consists of a skew detection sensor arrangement, but the acceptability of the image quality can also be judged on the basis of the image contrast.

With reference to FIG. 12, for example, when the document 48 is brought to the reading position, light from a light source 122 is reflected from the document surface and focused by a lens system 124 to converge on a light receiver 126. This converts the reflected light to analog signals which are input to a comparator 128 which compares the input from the light receiver 126 with prescribed threshold values and binarizes each signal to a black level (0) or white level (1) according to the result of the comparison. The binarized image information is then output from the system as binary image output signals and is also output via AND gates 130 and 132 to counters 134 and 136.

The binary image information is input to one of the input terminals of the AND gates 130 and 132, and the output of a region designation circuit 138 is input to the other input terminal, enabling the logical product thereof to be obtained.

The region designation circuit 138 is comprised of a pair of time delay circuits 138a and 138b and an AND gate 138c. The input side document sensor 28 which detects a document 48 inputs a detection signal to the time delay circuit 138a, while image information from the light receiver 126 is input to the other time delay circuit 138b. The AND gate 138c outputs a 11111 only when the time delay circuits 138a and 138b both produce an output. Therefore, suitably adjusting the length of the time delay of the time delay circuit 138a according to the region that has been set enables the region that is counted by the counters 134 and 136 to be designated.

Counters 134 and 136 count the numbers of black and white level pixels in regions designated by the region designation circuit 138, and these pixel counts are output to respective digital comparators 140 and 142. Prescribed reference count values for black and white level pixels are input to the digital comparators 140 and 142. These digital comparators 140 and 142 compare the pixel counts output by the counters 134 and 136 with the reference count values. These reference count values provide a measure of the proper number of pixels in the designated regions. For example, if comparison by the digital comparator 140 shows the number of white level pixels obtained from the counter 134 to be lower than the reference count value, it would signify that a wrong binarization threshold setting has been used for the comparator 128, causing pixels which should have been binarized to a white level to instead be erroneously assigned a black level, thus causing the number of white level pixels to fall short of the reference value, or it will be determined that some anomaly has occurred, producing large numbers of black level pixels in the information in the prescribed region of the document 48. That is, for one or the other reason the proper image contrast could not be obtained and as a result the image is judged as being of poor quality.

Likewise, if comparison by the digital comparator 140 shows the number of black level pixels obtained from the counter 136 to be lower than the reference count value, it would signify that a wrong binarization threshold setting has been used for the comparator 128, causing pixels which should have been binarized to a black level to instead be erroneously assigned a white level, thus causing the number of black level pixels to fall short of the reference value, or it will be determined that some anomaly has occurred, producing large numbers of white level pixels in the information in the prescribed region of the document 48. That is, for one or the other reason the proper image contrast could not be obtained and as a result the image is judged as being of poor quality.

Thus, if an anomaly is detected as a result of the operation of the digital comparators 140 and 142, a detection signal is output to the OR gate 144. Detection of such an anomaly by either of the digital comparators 140 and 142 will cause an anomaly detection signal to be output from the OR gate 144 to one of the input terminals of an AND gate 146.

Input to the other input terminal of the AND gate 146 is a signal from an edge detection circuit 148 which detects the edge of the document 48 based on the detection signal from the document sensor 28. When it is determined that all of the documents 48 have been read and that the document reading operation is finished, based on the edge detection signal, if during the course of the reading an anomaly has been detected in the region designated by the region designation circuit 138, a signal is output from the AND gate 146 to sound a buzzer to alert the operator to the existence of the anomaly.

Thus, the sixth embodiment of the invention automatically detects errors that may occur in the image binarization process, making it usable as an image quality judgement means utilizing image contrast anomalies.

Figure 13:
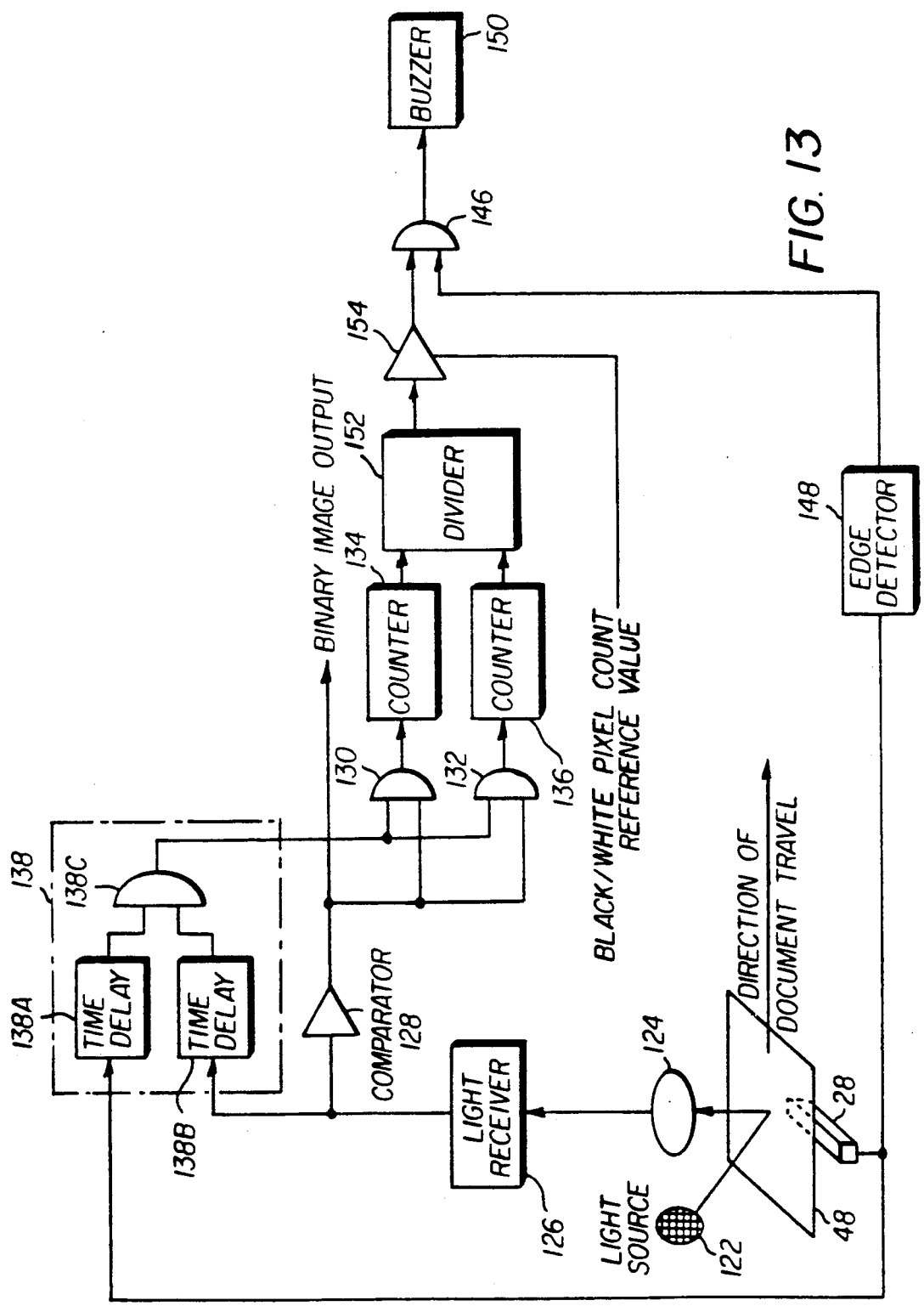
FIG. 13 is a circuit diagram of an image quality judgement means according to a seventh embodiment.

FIG. 13 is a circuit diagram of the image quality judgement means according to a seventh embodiment. In structure this embodiment is substantially the same as the sixth embodiment. What is different is that when the black and white pixels in the region designated by the region designation circuit 138 are counted by the counters 134 and 136, the counts are input to a divider 152 to obtain the ratio between the colors. The ratio thus obtained is then output from the divider 152 to a comparator 154 for comparison with predetermined reference count values for each pixel color.

As has been described above, incorrect binarization of the document information will produce anomalous pixel count values, and the ratio between the colors will also show a deviation from the proper values. As such, if the correct ratio of white to black pixels in the designated region is taken as 10:1, a threshold value setting used for the comparator 128 during the binarization process which is lower than it should be will result in a higher number of white pixels and a correspondingly lower number of black pixels, bringing the ratio down below 10:1, from which it can be deduced that an anomaly has occurred. In such cases, as in the sixth embodiment, an AND gate 146 sends a signal to a buzzer 150 to alert the operator to the presence of the anomaly.

Figure 14:
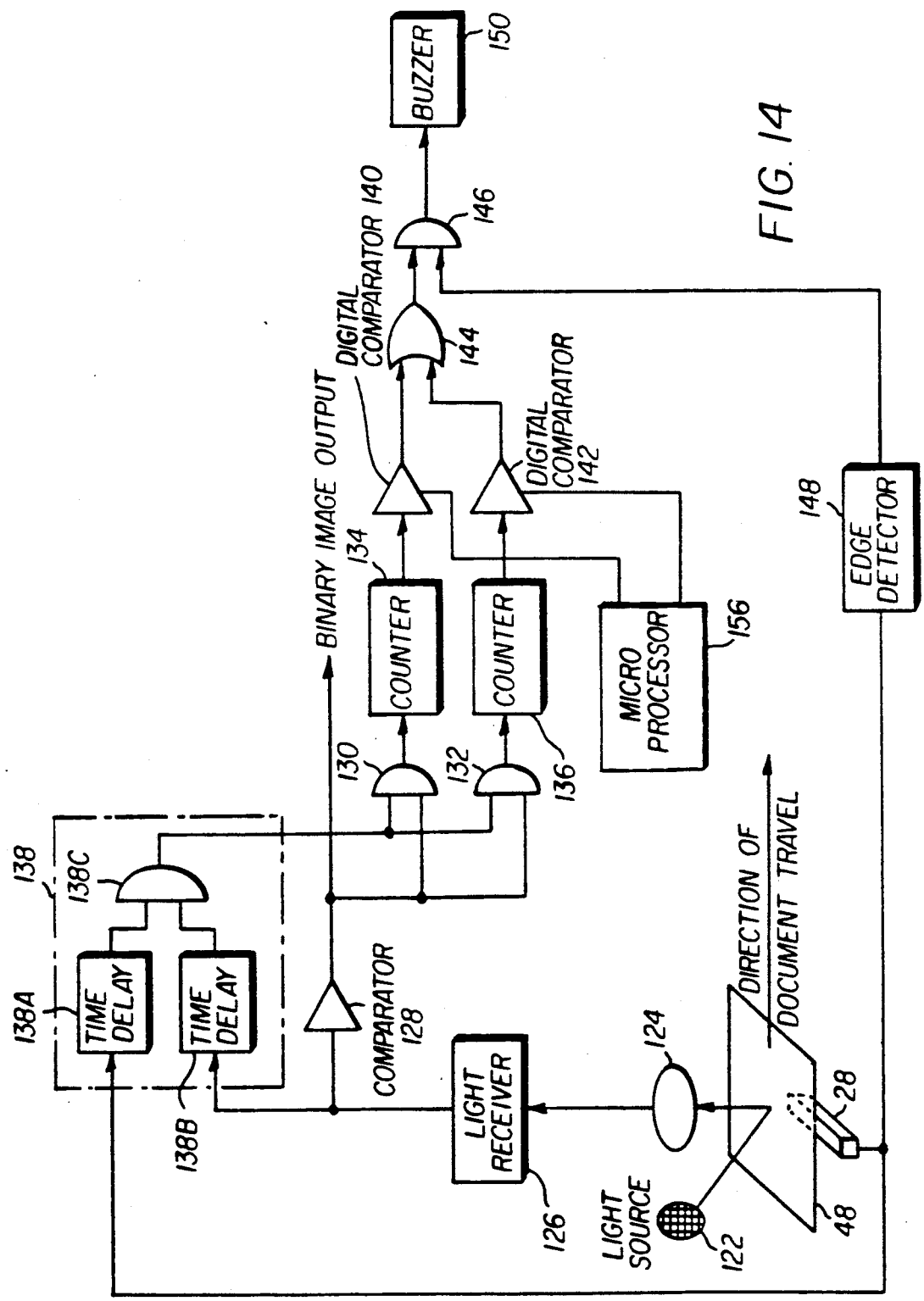
FIG. 14 is a circuit diagram of an image quality judgement means according to an eighth embodiment.

FIG. 14 is a circuit diagram of the image quality judgement means according to an eighth embodiment. In this embodiment the pixel counts of the counters 134 and 136 are input to a microprocessor 156. This microprocessor 156 is used to hold black and white pixel counts from the designated regions of a multiplicity of documents and, based on these counts, to use these counts to calculate statistical values such as count averages and distributions for output to the digital comparators 140 and 142 to form reference thresholds. Using anomaly detection thresholds statistically based on the binarized pixel data of the documents concerned enables thresholds to be set automatically to optimum levels instead of having to rely on experience or instinct.

Figure 15:
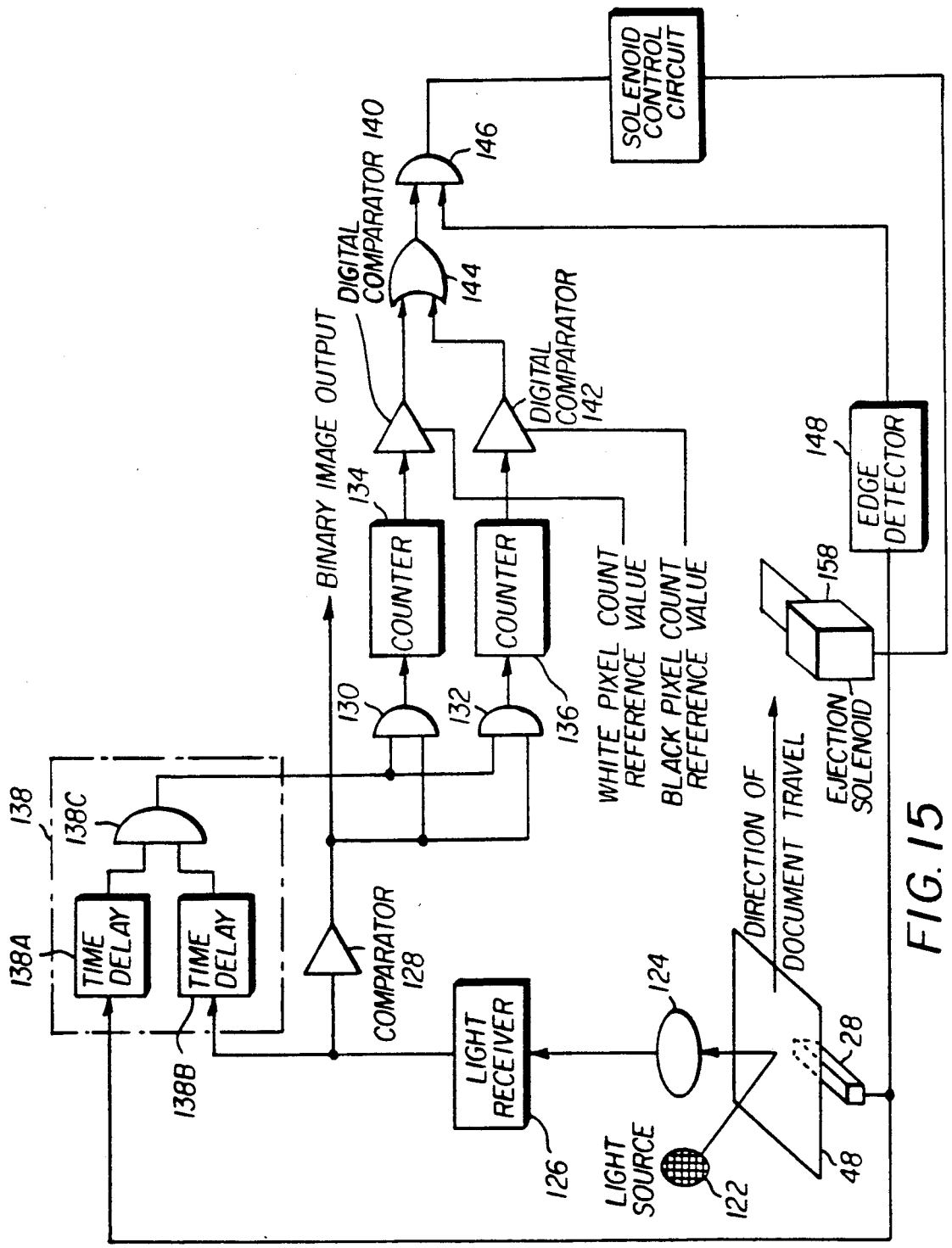
FIG. 15 is a circuit diagram of an image quality judgement means according to a ninth embodiment.

FIG. 15 is a circuit diagram of the image quality judgement means according to a ninth embodiment. In this embodiment, instead of the buzzer 150 of the sixth embodiment, a solenoid control circuit 160 is provided for controlling a document 48 ejection solenoid 158. Upon receiving an anomaly detection signal from the AND gate 146 the solenoid control circuit 160 activates the ejection solenoid 158 to eject the document concerned via a different ejection path. This alerts the operator to the fact that a document anomaly has appeared and also enables the document concerned to be immediately distinguished from the other documents. A print head unit and printer control circuit may be used instead of the solenoid 158 and solenoid control circuit 160, whereby the gist of the anomaly detection can be printed on the document concerned.

The sixth to ninth embodiments may be arranged so that anomaly detection signals are fed back to the comparator 128 to enable the threshold to be adjusted to prevent the anomaly occurring again.

The invention has been described in detail with particular reference to certain preferred embodiments thereof, but it will be understood that variations and modifications can be effected within the spirit and scope of the invention.

What is claimed is:

1. A document reader apparatus comprising:

image data reading means for optically reading and converting an image of a document to image data represented by electrical signals;

first image data storage means for storing the image data;

image quality judgement means for (a) detecting the orientation of a predetermined edge of the document being fed to the image data reading means, (b) providing a primary judgement of the acceptability of the image data of the document acquired by the image data reading means, and (c) providing a first control signal to the first image data storage means when the image data is primarily judged as being of acceptable quality for causing said acceptable quality image data to be outputted, and a second control signal to the first image data storage means when the image data is primarily judged as being of unacceptable quality; and image display means for providing on a monitor display screen a readout of the image data which is primarily judged as being of unacceptable quality in response to the second control signal from the image quality judgement means for providing a secondary visual judgement as to whether such primarily judged unacceptable quality image data is visually deemed acceptable or unacceptable.

2. The document reader apparats of claim 1 wherein the image quality judgement means further comprises selection means for selectively providing a secondary first control signal and a secondary second control signal in response to an operator determining that the primarily determined unacceptable quality image data which is displayed on the image display means is of acceptable or unacceptable quality, respectively, during the making of the secondary visual judgement.

3. The document reader apparatus of claim 1 wherein the image quality judgement means comprises:

first and second spaced-apart photosensors aligned normal to the path of a document being fed towards the image data reading means, each photosensor separately detecting the presence of the predetermined edge of the document moving past the photosensor and providing an output signal representative of such detection;

time difference detecting means for detecting a difference in time in the output signals from the first and second photosensors and comparing such time difference for determining a degree of skew of the document; and comparing means for comparing the degree of skew determined by the time difference detecting means with a reference value for determining whether the image quality is of acceptable or unacceptable quality and providing the first and second control signal, respectively, in response to such determination.

4. The document reader apparatus of claim 3 wherein the image quality judgement means further comprises selection means for selectively providing a secondary first control signal and a secondary second control signal in response to an operator determining that the primarily determined unacceptable quality image data which is displayed on the image display means is of acceptable or unacceptable quality, respectively, during the making of the secondary visual judgement.

5. The document reader apparatus of claim 4 wherein each document that is determined as being of unacceptable quality by the image quality judgement means is immediately displayed on the image display means, and the image data reading means is interrupted from reading further documents until the secondary visual judgement is made.

6. The document read apparatus of claim 1 wherein the apparatus further comprises a second image data storage means for storing image data from the first image data storage means which the image quality judgement means has judged as being of unacceptable quality without interrupting the image data reading means from reading further documents.

7. The document reader apparatus of claim 6 wherein each document that is stored in the second image data storage means, which was primarily determined by the image quality judgement means as being of unacceptable quality, is sequentially displayed on the image display means after a series of documents have been read by the image data reading means for making the secondary visual judgement on each primarily determined unacceptable quality image before making the secondary visual judgement on a next subsequent primarily determined unacceptable quality image.

8. A document reader apparatus comprising:
   image data reading means for optically reading and converting an image of a document to image data represented by electrical signals;
   first image data storage means for storing the image data;
   image quality judgement means for (a) detecting the orientation of a predetermined edge of the document being fed to the image data reading means, (b) providing a primary judgement of whether of the image data of the document acquired by the image data reading means is of acceptable or unacceptable quality, and (c) providing a first control signal to the first image data storage means when the image data is primarily judged as being of acceptable quality so that the image data of acceptable quality is outputted, and a second control signal to the first image data storage means when the image data is primarily judged as being of unacceptable quality;
   second image data storage means for storing image data transmitted from the first image data storage means in response to the second control signal from the image quality judgement means without interrupting the image data reading means from reading further documents; and
   image display means for providing on a monitor display screen a readout of the image data which was stored in the second image data storage means in response to the second control signal from the image quality judgement means for providing a secondary, visual judgement as to whether such primarily judged unacceptable quality image data is visually deemed acceptable or unacceptable after the image data reading apparatus has completed a reading of a series of documents.

9. The document reader apparatus of claim 8 wherein the image quality judgement means further comprises selection means for selectively providing a secondary first control signal and a secondary second control signal in response to an operator determining that the primarily determined unacceptable quality image data which is displayed on the image display means is of acceptable or unacceptable quality, respectively, during the making of the secondary visual judgement.

10. The document reader apparatus of claim 8 wherein the image quality judgement means comprises:
   first and second spaced-apart photosensors aligned normal to the path of a document being fed towards the image data reading means, each photosensor separately detecting the presence of the predetermined edge of the document moving past the photosensor and providing an output signal representative of such detection;
   time difference detecting means for detecting a difference in time in the output signals from the first and second photosensors and comparing such time difference for determining a degree of skew of the document; and
   comparing means for comparing the degree of skew determined by the time difference detecting means with a reference value for determining whether the image quality is of acceptable or unacceptable quality and providing the first and second control signal, respectively, in response to such determination.

11. The document reader apparatus of claim 10 wherein the image quality judgement means further comprises selection means for selectively providing a secondary first control signal and a secondary second control signal in response to an operator determining that the primarily determined unacceptable quality image data which is displayed on the image display means is of acceptable or unacceptable quality, respectively, during the making of the secondary visual judgement.

* * * * *